3,561,212
HYDROSTATIC TRANSMISSION
John W. Pinkerton and Lyle S. Martin, La Salle, Ill., assignors to Sundstrand Corporation, a corporation of Delaware
Filed Jan. 27, 1969, Ser. No. 794,078
Int. Cl. F16d *31/02*
U.S. Cl. 60—53                                      8 Claims

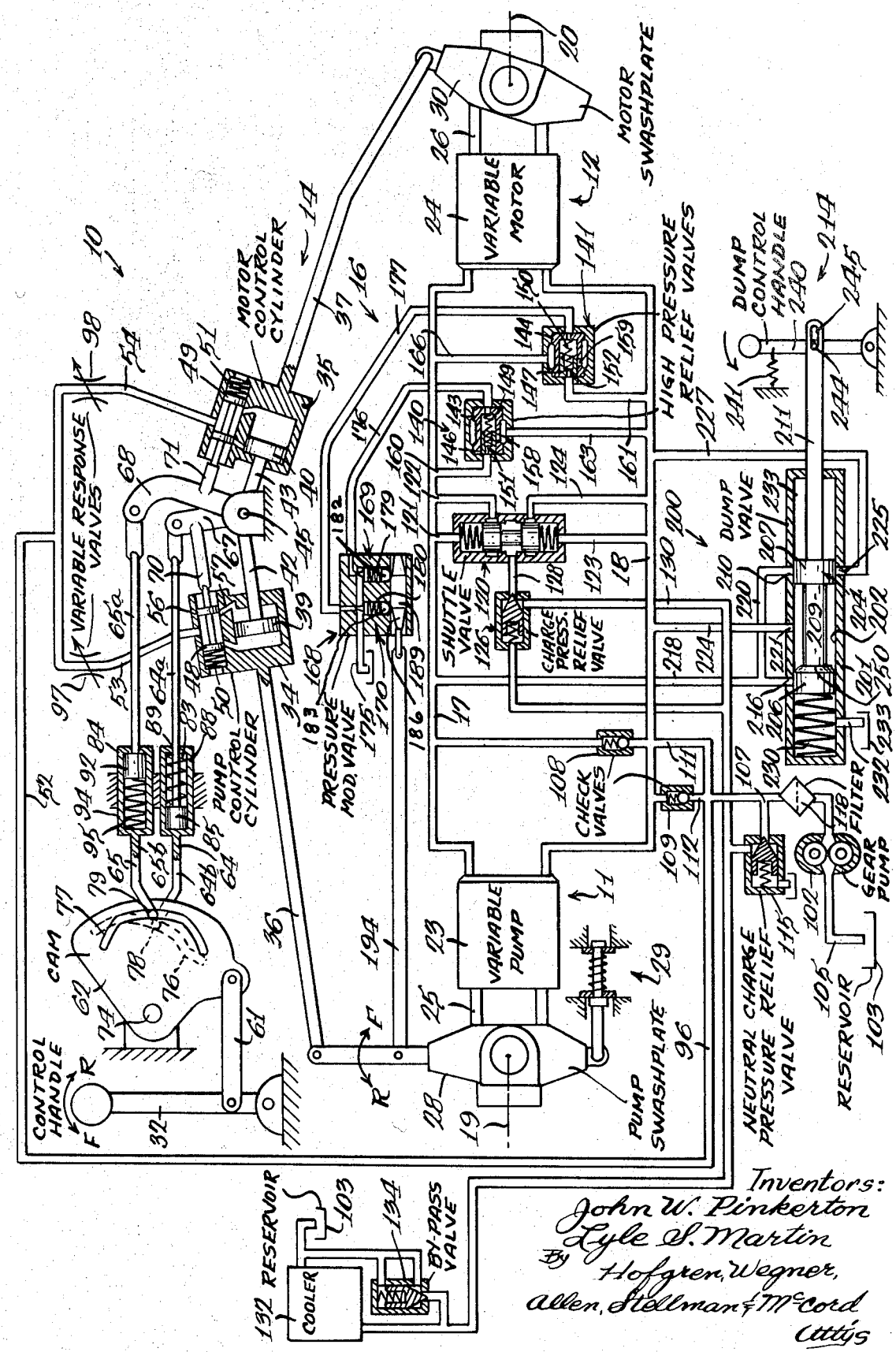

ABSTRACT OF THE DISCLOSURE

A hydrostatic transmission for a vehicle including a variable displacement hydraulic pump and a variable displacement hydraulic motor interconnected in closed circuit by main fluid conduits, there being provided a dump valve for selectively interconnecting the conduits to permit free wheeling of the motor, with this dump valve being responsive to a pressure differential in the main conduits to hold the valve in its dump or free wheeling position so that the valve will automatically return to its inactive position only when the pressure in the main conduits is approximately equal preventing vehicular jerking which would occur otherwise if the dump valve could be manually deactivated when there was a pressure differential between the conduits.

BACKGROUND OF THE PRESENT INVENTION

Hydrostatic transmissions including multiple piston pumps and motors with cams for reciprocating the pistons have gain considerable acceptance as infinitely variable transmissions in many types of vehicles. These transmissions are frequently provided with two main conduits interconnecting the pump and the motor each of which can act either as a delivery conduit from the pump to the motor or a return conduit, or high or low pressure conduit depending upon the displacement of the hydraulic units and the external load applied to the transmission. In many transmissions of this type it is desirable to provide a valve which selectively interconnects, sometimes in modulating fashion, these two main conduits so that a portion or all of the hydraulic fluid from the pump is bypasssed from the high pressure conduit to the low pressure conduit and this permits what is termed "free wheeling" of the motor. That is, the motor may be driven by vehicle inertia acting as a pump without the transmission performing any braking action on the vehicle which would otherwise occur if the displacement of the pump were less than the displacement of the motor under these conditions. In these hydraulic transmission controls which include such a dump valve, it is necessary to provide other means for braking the vehicle such as mechanical brakes on the vehicular wheels.

It is apparent that the above described dump valve or main conduit bypass valve acts in the nature of a clutch on the transmission in that it permits the free movement of the vehicular wheels without transmission or engine braking. A disadvantage, however, in these prior dump valves has been that when they are reset from their bypass position to their inactive position blocking direct communication between the main conduits, the sudden delivery of fluid from the pump to the motor in excess of the demand of the motor causes the sudden jerking of the associated vehicle. It is apparent that this jerking movement of the vehicle associated with the deactivation of the dump control valve or clutch is undesirable and the present invention has for its primary object the elimination and minimization of this disadvantage.

SUMMARY OF THE PRESENT INVENTION

In accordance with the present invention a dump valve is provided of the type described generally above for a transmission. It is manually movable to a position interconnecting the conduits in bypass fashion but moves back to its deactive position only when the flow from the pump matches the flow from the motor and when this occurs the dump valve moves automatically to its deactive position again hydraulically interconnecting the pump and the motor but doing so smoothly and without jerking of the associated vehicle.

Toward this end the dump valve includes a movable valve member that is biased to its neutral position by a spring and which is in a sense bistable in that it is maintained in its free wheeling or bypass position by the differential fluid pressure in the main conduits. Suitable conduits are provided so that the differential pressure in the conduits provides a biasing signal sufficient to overcome the force of the spring normally tending to urge the dump valve member to its inactive position. When the flow from the pump matches the flow from the motor, a condition which can be produced when the operator reduces the displacement of the pump during free wheeling, the pressure in the main conduits will momentarily be equal and under these conditions the differential fluid pressure acting on the dump valve is insufficient to overcome the bias of the spring and the dump valve moves to its inactive position again interconnecting the pump and the motor in conventional closed circuit fashion reinstating the fluid transmission drive of the vehicle to normal operation.

BRIEF DESCRIPTION OF THE DRAWING

The drawing is a schematic view of a transmission incorporating the present invention.

DESCRIPTION OF THE PREFERRED EMBODIMENT

Referring to the drawing a hydrostatic transmission 10 is seen to include a reversible variable displacement pump 11, a variable displacement motor 12, a displacement control 14 for the pump and the motor, and a system pressure control 16. The pump 11 and the motor 12 are interconnected by a closed hydraulic circuit including main conduits or passages 17 and 18. The pump 11 is adapted to be driven by a shaft indicated schematically at 19 connected with the prime mover of the associated vehicle (not shown). The variable displacement motor drives an output shaft 20 which is adapted to be connected through suitable gearing to the vehicle's propelling wheels or tracks.

Preferably both the pump and the motor are of an axial piston type having rotatable cylinder blocks 23 and 24, respectively, each with a plurality of cylinders in annular array and reciprocal pistons 25 and 26 (indicated schematically), respectively, having ends reciprocating in the cylinders. The pump 11 has a variable angle reversible swashplate 28 engaged by the projecting ends of pistons 25 for controlling the speed as well as direction of rotation of the output shaft 20. The swashplate 28 is urged to a neutral center position by a spring mechanism 29. The motor has a variable angle swashplate 30 movable only on one side of a minimum displacement position.

The displacement control 14 selects the displacement of the pump and the motor, and hence transmission ratio, in accordance with the manually adjusted position of a control handle 32. The swashplates 28 and 30 are positioned by control cylinders 34 and 35 through links 36 and 37, respectively. These cylinders are slidable on pistons 39 and 40 having rods 42 and 43 pivoted at 45.

For supplying fluid to the cylinders 34 and 35 control valves 48 and 49 are provided slidable in suitable valve bores formed in the cylinders 34 and 35, respectively. Control fluid under pressure is delivered to the valves 48 and 49 through control passage 52 and branch passages 53 and 54. As the valves 48 and 49 shift from the position shown in the figure fluid will be ported from one of the control fluid lines to one or the other side of the associated pistons in the cylinders causing corresponding movement of the cylinders and the swashplates connected thereto. Both of the control cylinders 34 and 35 act as follow-up mechanisms relative to their servo valves 48 and 49. As the cylinders move in response to the porting of fluid across their associated control valves, they will travel to a position where one of the lands as at 56 will close a control passage as at 57 arresting movement of the control cylinder and the swashplate associated therewith. Since the control cylinders act as follow-up mechanisms, as system pressure changes cause variations in force on the swashplates, the control valves 48 and 49 will automatically adjust the pressure in their associated control cylinders to hold the swashplates in their preselected positions.

The control valves 48 and 49 are positioned by the control handle 32 through link 61, pivotally mounted cam 62, longitudinally slidable links 64 and 65, and pivotally mounted links 67 and 68 pivotal about pivot 45 and arranged to control the valves 48 and 49 by arms 70 and 71, which abut the ends of the valve stems. Springs 50 and 51 bias the valve stems 48 and 49 to follow abutments 70 and 71.

The cam 62 is pivotally mounted at 74 and has a pump control slot 76 and a motor control slot 77 receiving followers 78 and 79 on the ends of links 64 and 65, respectively. As the cam 62 is pivoted by movement of the control handle 32 the links 64 and 65 are moved longitudinally in accordance with the shape of the cam slots 76 and 77. These slots have a configuration such that as the control handle is moved from its neutral position shown towards maximum displacement in either direction the pump swashplate 28 will move towards maximum displacement with the motor swashplate remaining in its maximum displacement position, and with further movement of the control handle in the same direction the motor swashplate 30 will begin movement towards minimum displacement when the pump swashplate 28 reaches or nears its maximum displacement position.

Override assemblies 83 and 84 are provided in the links 64 and 65, respectively, to allow the operator to rapidly move the control handle 32 from full forward to full reverse and vice versa. In the event of a loss of control pressure the override springs will also serve to protect the links from damage. The override assembly 83 includes a piston 85 fixed to the end of link 64a, and link portion 64b has a cylinder 88 formed on the end thereof receiving piston 85. A spring 89 within the cylinder 88 biases the piston 85 to the end of cylinder 88 oposite the link 64a. Spring 89 permits rapid movement of link 64b to the left, while abutment 70 and spring 50 permit rapid movement to the right.

The override assembly 84 includes a piston 92 fixed to the end of link portion 65a slidable in a cylinder 94 carried on the end of link portion 65b, and a spring 95 within the cylinder 94 biasing the piston 92 to the end of the cylinder adjacent the link 65a. Spring 95 permits rapid movement of link 65b to the right while abutment 71 and spring 51 permit rapid movement toward the left.

Thus, if the pump control link 64 is moved too rapidly to the left tending to move valve 48 to the left beyond a position which can be accommodated by the associated valve bore in cylinder 34 the link 64 will resiliently extend. At the same time, abutment 71 leaves stem 49, and spring 51 urges the stem leftward. Conversely, if the link 65 is moved too rapidly to the right tending to cause movement of the control valve 49 to the right beyond a position which can be accommodated by the associated valve bore in cylinder 35, the link 65 will yield. At the same time, abutment 70 may leave stem 48 to be moved by spring 50. While the cam slots 76 and 77 normally stage the displacements of the pump and the motor, it is possible when the handle is moved rapidly and the override assemblies 83 and 84 come into play, for the pump and motor control cylinders 34 and 35 to act simultaneously along with the swashplates 28 and 30.

Variable restrictions 97 and 98 are provided in branch lines 53 and 54 respectively, for selectively controlling the response rate of the servo cylinders 34 and 35.

A positive displacement gear-type replenishing and cooling pump 102 is provided and is driven by suitable means by the engine or prime mover in the associated transmission. This pump is in communication with a reservoir 103 through a conduit 105 for supplying replenishing and cooling fluid to the system through a replenishing and control fluid conduit 107. The capacity of the pump is sufficient to replace leakage fluid, to supply control fluid to the valves 48 and 49 through passage 96 and to supply cooling fluid to the circuit in excess of that required for the aforementioned purposes in order to maintain the transmission at a relatively cool temperature.

A pair of spring biased check valves 108 and 109 are in communication with conduit 107 through branch passages 111 and 112 in turn communicating with main conduits 17 and 18, respectively. The pump 102 thus supplies replenishing and cooling fluid to the low pressure side of the circuit i.e., the low pressure one of the conduits 17 and 18, when the pressure in one of the branch passages 111 and 112 exceeds that in the associated main conduit. When the pressure in one of the main conduits is at a high level the check valves 108, 109 associated therewith will be maintained closed. A spring biased makeup relief valve 115 communicates with the passage 107 and serves to relieve fluid under excessive pressure.

A suitable filter 118 is provided at the outlet of gear pump 102.

For the purpose of removing heated fluid from the low pressure side of the circuit a shuttle valve 120 is provided. The shuttle valve is in communication with the conduits 17 and 18 by means of the conduits 121, 122, 123 and 124 and provides a means for removing heated oil displaced by cool oil supplied by replenishing pump 102. The fluid pressure in the conduits 17 and 18 acts through the conduits 121 and 123, respectively, to appropriately position the shuttle valve so that communication is established between a low pressure relief valve 126 and the low pressure side of the circuit through either conduit 122 or conduit 124 and a central passage 128 connected to the relief valve. The heated fluid passing through the low pressure relief valve 126 goes to the reservoir 103 through line 130. Line 130 conveys this heated fluid to a cooler 132. A bypass valve 134 is provided so that the heated fluid may bypass the cooler 132 in the event of a malfunction therein. The shuttle valve 120 is spring centered to a closed position so that during the transition of reversing pressure in the main conduits none of the high pressure oil is lost from the circuit.

An important aspect of the present invention is the system pressure control circuit 16, referred to generally above, provided for limiting pressure in the main conduits 17 and 18 by dumping oil from the high pressure conduit to the low pressure conduit during rapid acceleration, abrupt braking and sudden application of the load.

Included in this pressure control are relief valves 140 and 141, identical in construction, for limiting the pressure in the main conduits 17 and 18, respectively. The valves include stationary valve sleeves 143, 144 in which movable valve members 146, 147 are slidable. The valve members 146, 147 are biased to their closed position shown by springs 149, 150 as well as fluid pressure acting on the rear side of the valve member. Orifices 151, 152 are provided in the movable valve members 146, 147. The valve members when in an open position communicate a portion of ports 158, 159 to the interior of the sleeves. The forward side of the valve member 146 communicates with the fluid in main conduit 17 through line 160 and the forward side of valve member 147 communicates with main conduit 18 through line 161. When sufficient pressure is achieved in conduit 17 valve member 146 will move to the right permitting fluid to pass from conduit 17 through passage 160 and out port 158 and passage 163 to main conduit 18 (which would then be the low pressure conduit). Likewise when the pressure limit of valve 141 is exceeded, fluid from main conduit 18 will flow through passage 161 opening valve member 147 passing through port 159 and passage 166 to the main conduit 17 (which would then be the low pressure conduit).

The valve members 146 and 147 are biased to their closed position by fluid pressure acting on the rear side of these valves which is provided by the bleed orifices 151 and 152 in the valve members 146 and 147, respectively. By modulating the fluid pressure on the rear side of these valve members the pressure relief setting thereof may be controlled. For this purpose a pressure modulating valve 168 is provided including pilot valves 169 and 170 for controlling the pressure behind valve members 146 and 147, respectively.

The valves 169 and 170 include movable valve members which when open provide communication between the rear side of the valve members 146 and 147 and a suitable drain passage 175 through passages 176 and 177, respectively. The valve members are biased to the closed position shown in the drawings by springs 179 and 180 variably biased by plungers.

The plungers are positioned by an axially slidable spool cam 186 including a cylindrical central portion 189 which when in a neutral position places both of the plungers 182 and 183 in their uppermost positions effecting a maximum bias for the valve members. Extending from the central cylindrical portion 189 are tapered end portions.

The cam member 186 is positioned in response to the position of swashplate 28 by a link 194 which shifts the cam 186 to the right in response to a forward displacement of the swashplate 28 and shifts the cam to the left in response to a reverse displacement of swashplate 28. As the cam 186 shifts to the right from the neutral position shown in the drawing, plunger 182 will ride on cylindrical portion 189 maintaining valve 169 in its maximum pressure relief setting and the left plunger will ride down the left tapered cam portion decreasing the biasing force on pilot valve member. Conversely when the cam 186 is shifted to the left from the neutral position shown the left plunger will ride on the cylindrical cam portion 189 maintaining a predetermined maximum biasing force on the left valve member while the right plunger will ride down on the right cam portion decreasing the biasing force on the right valve member in accordance with the position of cam member 186.

In this manner the cracking pressure of the pilot valve members is mechanically modulated by the position of swashplate 28 between a low value, e.g. 2,000 p.s.i., and a predetermined high value, e.g. 5,000 p.s.i. Thus, the biasing force on the relief valve 140 and 141 is modulated between these high and low pressure values thereby variably limiting the pressure in the main conduits 17 and 18. When the pressure in one of the main conduits exceeds that modulated on the opposite side of the valve members 146 and 147 by the pilot valves the valve members 146 and 147 will open permitting fluid to bypass to the low pressure conduit.

The operation of the system pressure control 16 is as follows. With the vehicle standing still, the operator begins acceleration by pivoting the control handle 32 in the forward direction (F) shifting link 64 to the right with control valve 48 thereby porting fluid to the right side of cylinder 34. This causes clockwise pivotal movement of the pump swashplate 28 putting the pump into stroke. The pump delivers high pressure fluid through main conduit 17 to the motor 12 causing rotation of the motor propelling the vehicle in a forward direction. As the cam swashplate 28 pivots clockwise, the valve plunger 182 rides on the cylindrical high portion 189 of the cam maintaining the pilot valve 169 at its maximum pressure setting which biases relief valve 140 to its maximum pressure relief setting. If the operator attempts to accelerate the vehicle too rapidly, or if a load is suddenly encountered the pressure in main conduit 17 may exceed the maximum pressure relief setting of valve 140, e.g. 5,000 p.s.i. In this event, the right valve member yields, and valve member 146 will open porting fluid from conduit 17 to conduit 18 until the pressure in conduit 17 returns below the maximum pressure relief setting of valve 140.

When the swashplate 28 is on the forward side of neutral, the relief valve 141 is modulated to provide variable low pressure relief for the main conduit 18, then the return conduit, in accordance with pump displacement. If during the forward travel of the vehicle the operator reduces the displacement of the pump 11 by moving the control 32 toward neutral, the motor 12 will act as a pump driven by the inertia of the associated vehicle tending to drive the pump 11 as a motor. The pump thus acts as a metering device for flow from the motor and inherently tends to have an increased braking effect on the motor as the displacement of the pump 11 is reduced. The pressure relief valve 141 smooths out the braking effect and prevent very abrupt braking which would otherwise be possible.

With the motor 12 acting as a pump with the swashplate 28 in a forward displacement position, the pressure in the main conduits reverses with conduit 18 becoming the high pressure conduit and conduit 17 becoming the low pressure conduit. If the swashplate 28 is initially in its maximum forward displacement position and then moved toward neutral, the pressure setting of pilot valve 170 will be modulated by the left tapered cam portion from a minimum pressure setting, e.g. 2,000 p.s.i., towards its maximum pressure setting, e.g. 5,000 p.s.i. If the pressure in conduit 18 at this time exceeds the modulated low pressure setting of valve 141, valve member 147 will open permitting relief of fluid in conduit 18 through line 161 to main conduit 17 thereby reducing the braking effect. The shape of the cam 186 is determined so that the amount of modulation of the pilot valve is matched to the specific braking characteristics of the engine of the associated vehicle. In this manner the valve 141 when modulated maintains an acceptable torque level into the engine and yet provides an increased braking capability as the vehicle speed decreases.

As the operator moves the control handle 32 further towards neutral moving the displacement swashplate 28 nearer neutral, the pilot valve 170 will approach its high pressure setting as will the pressure relief valve 141 thereby permitting increased pressures in conduit 18. This thereby increases the braking effect.

The pressure control circuit 16 operates in an identical manner when the transmission and the vehicle are operating in reverse. In this case the functions of the valves 140 an 141 are reversed. Reverse drive is effected by movement of the operating handle 32 to the right causing the displacement servo-cylinder 34 to move the pump swashplate counterclockwise delivering fluid under pressure through conduit 18 to the motor with the motor returning fluid at low pressure through conduit 17 to the pump 11.

As the swashplate 28 moves from neutral, the cam 186 is shifted to the left from its neutral position shown maintaining the pilot valve 170 in its maximum pressure setting and modulating pilot valve 169 to an increasingly lower pressure setting as the pump cam moves toward maximum reverse displacement. Thus, relief valve 141 is biased to a maximum pressure relief setting to limit pressure in conduit 18 during acceleration of the abrupt application of load, and pressure relief valve 140 is modulated at a lower pressure relief setting in accordance with pump displacement to control the braking effect in reverse by limiting pressure in conduit 17. This proceeds in the same manner as described above except that the function of the conduits 17 and 18 is reversed when the pump displacement is reversed.

While movement of the control in one direction has been designated "forward," and movement in the opposite direction designated "reverse," it should be understood that either direction may be forward, depending on the direction of rotation of the input shaft 19.

A further and important feature of the invention is in the provision of a dump valve 200 which effectively acts as a clutch for the hydrostatic transmission 10 by selectively interconnecting the main system conduits 17 and 18. As will appear hereinbelow the valve 200 is manually set to a position interconnecting the conduits and permitting free wheeling of the motor 12, but automatically returns to its position shown in the drawing blocking communication between these conduits only after the flow from the pump 11 is approximately equal to the flow from the motor 12 during free wheeling thereby preventing jerking of the associated vehicle when the transmission is again declutched.

Toward this end, the valve 200 includes a valve casing 201 having a valve bore 202 slidably receiving a valve member 204 haing lands 206 and 207 interconnected by a reduced stem portion 209. Also part of the valve 204 is a stem portion 211 extending from land 207 and out the valve casing where it is connected to a suitable manual operation 214. The main conduit 17 is connected to a port 216 in bore 202 by passage 218, and also with a port 210 communicating with bore 202 through a passage 220. Port 216 is blocked by land 206 in the inactive position of the valve member 204 shown in the drawing and port 210 is blocked by land 207 in this position. Main conduit 18 communicates with bore 202 through port 221 and passage 224, and also with a port 225 communicating with bore 202 through a passage 227. In the inactive position of the valve member 204 port 221 communicates with the bore adjacent the reduced stem portion 209 and the port 225 is blocked by the land 207.

The valve member 204 is in its inactive or declutched position as shown in the drawing, and is adapted to be moved from this position to the left as it interconnects the conduits 17 and 18 placing the transmission in its free wheeling position. Biasing the valve member 204 to the inactive position is a spring 230 seated in the left end of the valve bore and engaging the left side of the valve member 204. The chamber in which the spring 230 is seated is continuously drained by a suitable drain conduit 232 to tank 233. The valve spring 230 has sufficient strength to move the valve member to the inactive position shown if the force of fluid pressure in valve chamber 233 acting on the right end of valve member 204 falls below a predetermined value. This predetermined value is the pressure in chamber 233 when the pressure in main conduit 17 substantially equals the pressure in main conduit 18 as sensed through the passages 220 and 227 which communicate with chamber 233 when the valve member 204 is in its free wheeling or left position.

The manual control assembly 214 is provided for shifting valve member 204 from its inactive position shown to its active free wheeling left position but it does not return the valve to the inactive position. Toward this end, the manually operative control 214 is seen to include a pivotal control handle 240 biased by a spring 241 to its neutral position. The handle has a pin 244 slidable in a slot 245 in the valve stem 211. When the valve member 204 is in its inactive position, the pin 244 engages the left end of slot 245. The slot 245 has sufficient length so that after the operator shifts the valve member 204 to its active free wheeling position, the spring 241 will immediately return the handle 240 to its neutral position shown without moving the valve member 204.

In the active or left position of the valve member 204, land 206 uncovers port 216 and provides full communication between passages 218 and 224 thereby interconnecting the main conduits 17 and 18. Valve land 206 has a beveled portion 250 which provides gradual communication between these passages as the valve member 204 moves to its left position under operator control. Also when the valve is in the left or active position, valve land 207 uncovers ports 210 and 225 to chamber 233. While this provides communication between the main conduits 17 and 18, the primary function of this porting is to subject the chamber 233 to the pressure in the higher one of the main conduits 17 and 18.

In operation of the valve 200, when the operator desires vehicle or transmission free wheeling, he depresses the handle 240 to the left shifting the valve member 204 to the active free wheeling position interconnecting main conduits 17 and 18 through passages 218 and 224 and to a lesser extent through passages 220 and 227. Under these conditions the associated vehicle will coast and the operator can apply the mechanical brakes (not shown) if desired.

As long as a pressure differential exists between the conduits 17 and 18, the pressure in chamber 233 will be sufficient to maintain the valve member 204 in its left free wheeling position. If the operator desires to declutch the transmission 10 and re-establish closed circuit communication between the pump and the motor, it is necessary that he vary the displacement of the hydraulic units 11 and 12 by manipulation of the control handle 32 until the flow from the pump approximately equals the flow from the motor. For example, if the displacement of the pump were greater than the displacement of the motor and each were rotating at equal speeds, it would be necessary to reduce the pump displacement to achieve this flow equality.

When the flow from the pump approximates the flow from the motor, the pressure in conduits 17 and 18 will momentarily be equal and the pressure in valve chamber 233 will fall to a value permitting the spring 230 to return the valve member 204 to its right inactive position blocking ports 216, 210 and 225 and thereby interrupting communication between the main conduits 17 and 18.

Thus, according to the present invention, the dump valve 200 is manually operable to its free wheeling position but only automatically returns to its inactive position when the flow from the pump approximates the flow from the motor thereby minimizing any jerking of the associated vehicle as the transmission is reactivated.

We claim:

1. A hydraulic transmission, comprising: a hydraulic pump unit, a hydraulic motor unit, conduit means interconnecting the pump and the motor units, means for varying the displacement of one of said units, dump valve means movable to a position for selectively substantially interrupting flow in said conduit means to permit free wheeling of said hydraulic motor unit, said dump valve means including means for holding said valve means in said position until the flow from the pump unit approximates the flow from the motor unit to minimize pressure surges in said conduit means when the dump valve means returns to a position permitting flow in said conduit means from said pump unit to said motor unit 2. A hydrostatic transmission, comprising: a hydraulic pump unit, a hydraulic motor unit, first conduit means connecting the pump unit to the motor unit, second conduit means connecting the motor unit to said pump unit, dump valve means for selectively connecting said first and second conduit means to permit free wheeling of said motor unit, and means responsive to fluid in said first or second conduit means for maintaining said dump valve means in a position providing communication between said conduit means independently of pump unit speed.

3. A hydrostatic transmission comprising: a hydraulic pump unit, a hydraulic motor unit, first conduit means connecting the pump unit to the motor unit, second conduit means connecting the motor unit to said pump unit, dump valve means for selectively connecting said first and second conduit means to permit free wheeling of said motor unit, means responsive to fluid in said first or second conduit means for maintaining said dump valve means in a position providing communication between said conduit means, and means for varying the displacement of one of said units so that the flow from one unit can be matched to the flow in the other unit permitting the dump valve means to automatically move to a position blocking flow between said conduit means and reestablishing normal transmission operation.

4. A hydrostatic transmission comprising: a hydraulic pump unit, a hydraulic motor unit, first conduit means connecting the pump unit to the motor unit, second conduit means connecting the motor unit to said pump unit, dump valve means for selectively connecting said first and second conduit means to permit free wheeling of said motor unit, means responsive to fluid in said first or second conduit means for maintaining said dump valve means in a position providing communication between said conduit means, said dump valve means including a movable valve member, said valve member being movable to a first position blocking communication between said first conduit means and said second conduit means, said valve member being movable to a second position establishing communication between said first conduit means and said second conduit means, means biasing said valve member to said first position, manually operable means for placing said valve member in said second position against the biasing force of said biasing means, and a fluid pressure means urging said valve member in the other direction with sufficient force to maintain the valve member in said second position until the pressure in said first conduit means approximates the fluid pressure in said second conduit means.

5. A hydrostatic transmission as defined in claim 4, wherein said fluid pressure means includes first port means in said dump valve means communicating with said first conduit means, second port means in said dump valve means communicating with said second conduit means, said valve member in said first position blocking communication between both of said port means and one end of said valve member and in said second position providing communication between both of said port means and said one end of said valve member to hold the valve member in said second position.

6. A hydrostatic transmission comprising: a hydraulic pump unit, a hydraulic motor unit, first conduit means connecting the pump unit to the motor unit, second conduit means connecting the motor unit to said pump unit, dump valve means for selectively connecting said first and second conduit means to permit free wheeling of said motor unit, means responsive to fluid in said first or second conduit means for maintaining said dump valve means in a position providing communication between said conduit means, and means for varying the displacement of the dump unit including means for reducing the displacement of the pump when the dump valve means is in a position communicating said port and second conduit means whereby the flow from the pump can be matched with the flow from the motor to permit the automatic return of the dump valve to its non-communicating position.

7. A hydrostatic transmission as defined in claim 4, wherein said manually operable means includes a manually operable member for moving said valve member to said second position, means biasing said manually operable member to an inactive position, a lost motion connection between said manually operable member and said valve member permitting said manually operable member to return to said inactive position without moving said valve member back to said first position.

8. A hydrostatic transmission comprising: a hydraulic pump unit, a hydraulic motor unit, first conduit means connecting the pump unit to the housing, second conduit means connecting the motor unit to the pump unit, dump valve means for selectively connecting said first and second conduit means to permit free wheeling of said motor unit, manually operable means for placing said dump valve means in a position connecting said first and second conduit means, and means responsive to a predetermined fluid pressure in one of said conduit means for maintaining said dump valve means in a position connecting said first and second conduit means regardless of the position of the manually operable means.

References Cited

UNITED STATES PATENTS

| 3,106,108 | 10/1963 | Thoma et al. | 60—53AX |
|---|---|---|---|
| 3,126,707 | 3/1964 | Hann et al. | 60—53AX |
| 3,135,087 | 6/1964 | Ebert | 60—52BX |
| 3,153,900 | 10/1964 | Pigeroulet et al. | 60—52UX |
| 3,383,857 | 5/1968 | Rauchel et al. | 60—53A |

EDGAR W. GEOGHEGAN, Primary Examiner